Sept. 9, 1969          F. A. LA CROIX          3,465,930
DEVICE FOR CARRYING AND SUPPORTING PETS IN MOTOR VEHICLES
Filed Nov. 6, 1967
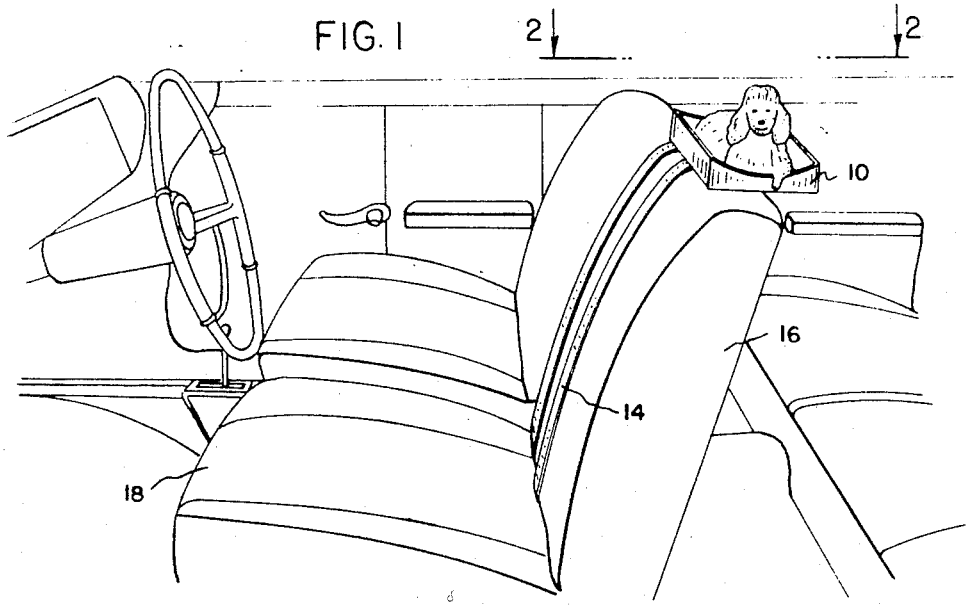
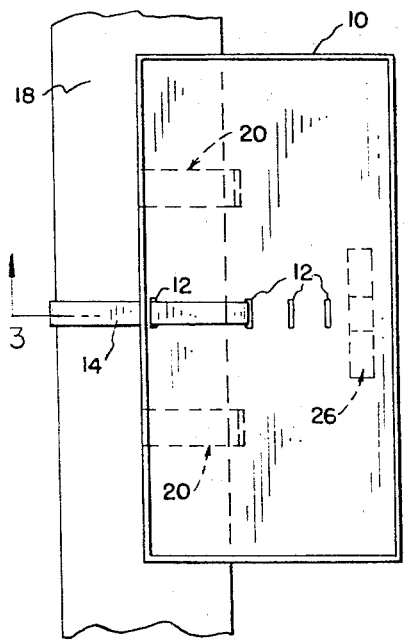
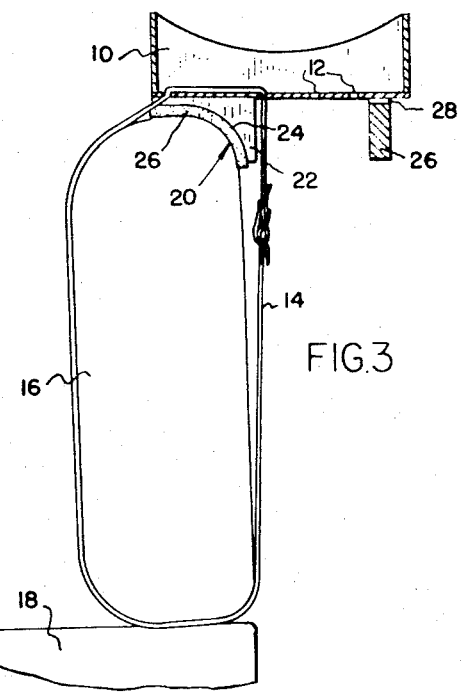
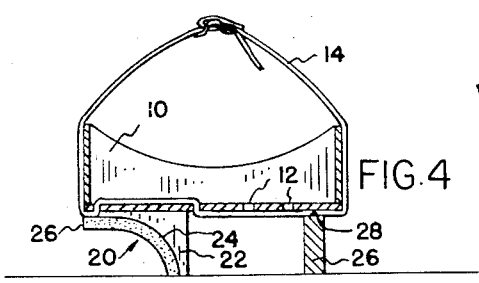
INVENTOR
FRANCIS A. LA CROIX
BY *Adolph D. Martin*
ATTORNEY United States Patent Office 3,465,930
Patented Sept. 9, 1969

3,465,930
DEVICE FOR CARRYING AND SUPPORTING
PETS IN MOTOR VEHICLES
Francis A. La Croix, 436 Pearl St.,
Marine City, Mich. 48039
Filed Nov. 6, 1967, Ser. No. 680,714
Int. Cl. B60r 7/00, 9/00
U.S. Cl. 224—42.42                                    2 Claims

ABSTRACT OF THE DISCLOSURE

A pet platform detachably mountable on the front seat of a motor vehicle which may also serve as a pet carrying basket when it is detached from the vehicle seat.

BACKGROUND OF THE INVENTION

This invention relates generally to devices for carrying pets and transporting them in motor vehicles. Most of such devices which are mountable on vehicle seats, obstruct the view, and interfere with the comfort of the driver and passengers alike. Furthermore, devices of this general type are usually bulky and consequently cumbersome to handle and attach. As a result the use of such pet carrying devices is extremely limited.

SUMMARY OF THE INVENTION

This invention comprises a tray 10 having thereon dependent brackets 20 shaped to seatably engage the back member 16 of a vehicle seat 18. An adjustable strap 14 on the tray 10, for attaching the platform to the vehicle seat 18, also provides a carrying handle when it is looped over the top of the tray 10.

BRIEF DESCRIPTION OF THE DRAWING

FIGURE 1 is a fragmentary perspective view showing the applicant's pet platform mounted on the back member 16 of a vehicle seat 18

FIGURE 2 is a top plan view, taken substantially on plane 2—2 in FIGURE 1, showing structural details of the tray, and the respective locations of the brackets 20 and the rectangular leg 26.

FIGURE 3 is a section view, taken substantially on plane 3—3 in FIGURE 2, showing the characteristic shape of the brackets 20, and the rectangular leg 26 on the lower side of the tray 10.

FIGURE 4 is a side elevation view of the platform, similar to FIGURE 3 but removed from the vehicle, and showing the adjustable strap 14 looped over the top of the tray 10 so as to provide a carrying handle.

DETAILED DESCRIPTION OF THE INVENTION

For a more detailed description of the invention, reference is made to the drawing in which numeral 10 designates a shallow tray having in the bottom thereof a plurality of spaced centrally disposed slots 12. An adjustable belt 14, of pliable material such as plastic, slidably extends through a pair of the slots 12 for encircling the back member 16 of a vehicle seat 18 as shown in FIGURE 3. A pair of spaced brackets 20 on the bottom of the tray 10 each comprise a dependent member 22 having an outwardly disposed concave face 24.

A resilient pad 26, of rubber or other similiar material having a surface with a high coefficient of friction, is attached to the concave face 24 on each of the dependent members 22. A rectangular leg 26 on the lower side of the tray 10 provides, in conjunction with the two brackets, 20, a three point support for holding the tray 10 in a lateral position when it is detached from the back member 16 of the vehicle seat 18, as shown in FIGURE 4.

The rectangular leg 26 has a laterally disposed slot 28 therethrough for slidably retaining the adjustable strap 14 when it is looped across the top of the tray 10 to provide a carrying handle for the platform as shown in FIGURE 4. In practice, it may prove desirable to substitute a pair of spaced members for the single rectangular leg 26 shown in FIGURE 3, thereby providing a four point support for the platform when it is resting on a flat surface.

Based upon the foregoing discussion, the applicant is of the opinion that his invention has fulfilled a long-felt need in the field of pet carrying and transporting devices, and that he has made a valuable and significant contribution to the related art. However, while the invention was described with reference to the structural details of a single embodiment, the principles involved are susceptible of numerous other practical adaptations.

Therefore, I claim as new and desire to secure by Letters Patent:

1. A pet platform for attachment to the seat of a motor vehicle, such platform comprising a tray, at least one bracket on the bottom of the tray for engaging the vehicle seat, a pliable elongated member on the tray for detachably securing the platform to the vehicle seat, and at least one leg on the bottom of the tray for use in conjunction with the brackets to support the platform when it is detached from the vehicle seat.

2. The pet platform of claim 1 in which the leg has an opening for receiving therethrough the pliable elongated member when it is looped over the top of the tray so as to provide a carrying handle for the platform.

References Cited

UNITED STATES PATENTS

| 1,912,514 | 6/1933 | Curtis et al. | 224—42.43 XR |
| 2,224,999 | 12/1940 | Mover. | |
| 2,499,103 | 2/1950 | Love | 224—42.45 X |
| 2,633,180 | 3/1953 | Reed. | |
| 2,869,146 | 1/1959 | Allison | 5—118 |
| 3,337,751 | 8/1967 | Brown | 224—42.42 |
| 2,797,033 | 6/1957 | Rasbock | 224—42.45 X |

GERALD M. FORLENZA, Primary Examiner

U.S. Cl. X.R.
5—118; 119—1; 224—42.43